(12) United States Patent
Shuster

(10) Patent No.: US 6,389,458 B2
(45) Date of Patent: *May 14, 2002

(54) METHOD, APPARATUS AND SYSTEM FOR DIRECTING ACCESS TO CONTENT ON A COMPUTER NETWORK

(75) Inventor: Brian Shuster, Stateline, NV (US)

(73) Assignee: Ideaflood, Inc., Zephyr Cove, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,605

(22) Filed: Oct. 30, 1998

(51) Int. Cl.[7] .............................................. G06F 15/167
(52) U.S. Cl. ...................... 709/213; 709/219; 709/291; 345/357
(58) Field of Search ........................... 705/14, 26, 238; 709/245, 202, 213, 219, 291; 707/10; 345/326, 339, 357

(56) References Cited

U.S. PATENT DOCUMENTS

| | | | | |
|---|---|---|---|---|
| 5,793,964 A | * | 8/1998 | Rogers et al. ............... | 709/202 |
| 5,796,967 A | * | 8/1998 | Filepp et al. ................ | 345/339 |
| 5,970,472 A | * | 10/1999 | Allsop et al. ................ | 705/26 |
| 6,034,680 A | * | 3/2000 | Kessenich et al. ........... | 345/329 |
| 6,044,372 A | * | 3/2000 | Rothfus et al. ............... | 707/10 |
| 6,049,835 A | * | 4/2000 | Gagnon ....................... | 709/245 |
| 6,052,120 A | * | 4/2000 | Nahi et al. .................... | 345/326 |
| 6,061,659 A | * | 5/2000 | Murray ........................ | 705/14 |
| 6,170,060 B1 | * | 1/2001 | Mott et al. ................... | 713/201 |

* cited by examiner

*Primary Examiner*—Ayaz Sheikh
*Assistant Examiner*—Firmin Backer
(74) *Attorney, Agent, or Firm*—O'Melveny & Myers LLP

(57) ABSTRACT

Embodiments of the instant invention are directed to a method, apparatus and system for directing an on-line user to predetermined information. Preferred embodiments of the instant invention interface with the user's browser to utilize the functions of the browser for directing user "traffic" on a network. In preferred embodiments, when a user accesses a web site page, a traffic control program is executed for the page, wherein the traffic control program controls the transmission (downloading) of data to the user computer and further creates a modified set of rules for at least one of the browser functions. Upon query (or other interaction) by the browser prior to closing page, the traffic control program interacts with the browser software to modify or control one or more of the browser functions, such that the user computer is further directed to a predesignated site or page (and displays a predesignated frame) upon execution of a browser function, instead of accessing the site or page typically associated with the selected browser function.

42 Claims, 4 Drawing Sheets

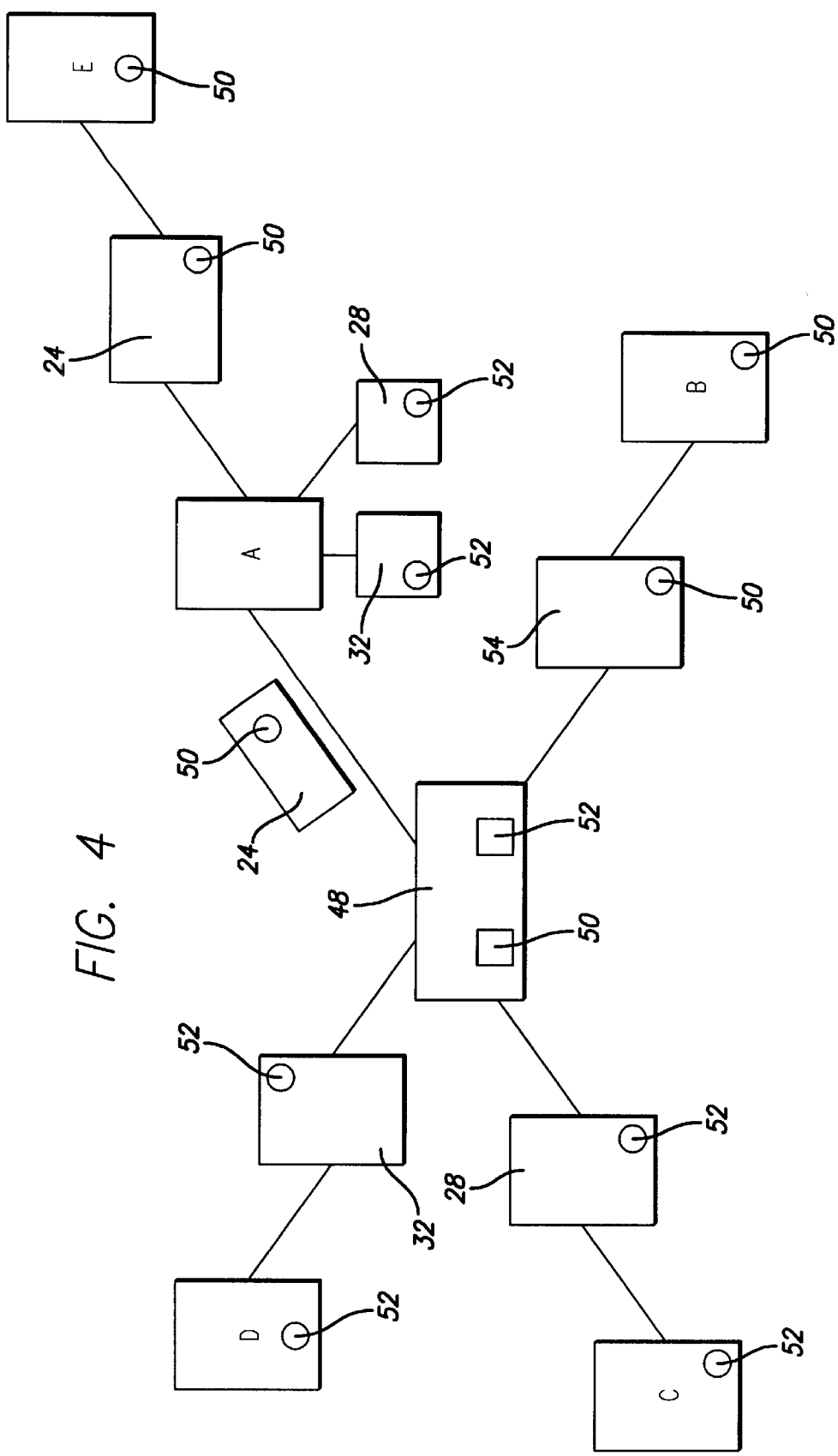

METHOD, APPARATUS AND SYSTEM FOR DIRECTING ACCESS TO CONTENT ON A COMPUTER NETWORK

FIELD OF THE INVENTION

This invention is directed to a method, apparatus and system for directing and diverting access to content on a computer network and, in preferred embodiments, for effectively directing on-line users to predetermined information, including, but not limited to, promotional, sales, advertising, safety, health, political or governmental information.

BACKGROUND OF THE INVENTION

Since their early development in the 1950's and 1960's, the use of computer networks for communication and sharing of information (or content) between multiple computers has become increasingly popular and diverse. In many modern businesses and organizations, computers are interconnected in a closed architecture, or intranet, to allow communication between defined computers within the business or organization. Open, public-access networks, typically referred to as internets, on the other hand, allow access to any computer that logs on (or otherwise connects) to the network. The largest open network is the Internet, which is composed of a large number of computers interconnected through internets, intranets or individually, enabling computer users to share vast amounts of on-line information and resources.

Information (or content) is generally transferred between computers on the network as files, which may contain data corresponding to, for example, text, photographs, graphics, video and/or audio. A set of protocols, standards and programs, referred to as the World Wide Web (WWW), was developed in the 1980's to govern the manner in which multimedia files are created and displayed on the Internet. The Internet and WWW provide a practical manner for on-line end users, for example, students, professionals and businessmen, to access a large, and increasing volume of information for purposes, such as, research, education and marketing of goods and services.

Users, on user computers, access the Internet and the WWW through host Internet providers, including, but not limited to, private Internet providers, for example, Netcom, or on-line providers, for example, America On-Line, or Prodigy. To access and view the desired information, users utilize browser, a computer program which enables the user to view information or files communicated over the WWW. Example browsers include, but are not limited to Microsoft Corporation's INTERNET EXPLORER, or those sold under the trademarks NETSCAPE NAVIGATOR, IBM EXPLORER and NSCA MOSAIC.

The Internet is based on a client/server architecture scheme, wherein some computers, such as user computers requesting or obtaining information, act as clients, and other computers, such as the computers which contain (or otherwise provide access to) the requested information, act as a servers. Both the browsers and the servers typically utilize a Hypertext Transfer Protocol (HTTP) to communicate with each other and the WWW. Users who are operating a browser request information, or data content, from the server through HTTP. The server responds and provides the content to the browser, barring any restrictions, through HTTP. The browser, in turn, provides the requested information to the user.

HTTP allows access to files using Hypertext Markup Language (HTML), where HTML is a standard page description language. Typically, pages of content, or web sites, which a user may access on the WWW, are written in HTML. HTML defines a document format for these pages and further allows links to be specified to and from these pages to other servers and files. Links are programming features included in a content page and, upon activation, direct other content, such as a further page or web site, to the user computer. Links may include, for example, indicia displayed as part of the content page and may be activated by the user, such as through a mouse button, keyboard or other user-input device. Thus, pages on web sites may include links which, in effect, direct the movement of users to other sites, content locations or pages and allow users to quickly jump from page-to-page or site-to-site. In addition, browsers typically include programming functions that allow a user to jump, for example, back or forward through pages or sites that the user had previously accessed, or to favorite sites, home pages or the like.

While the ability to quickly move from one page or site to another has significant advantages in many contexts, it can be difficult to obtain a user's attention for sufficient time to, for example, provide the user with important information. Indeed, other than a link to an additional page of information, a typical web site operator may not be able to effectively direct the information accessed by a user such that a user's attention can be directed to particular information considered to be important by the web site operator, for example, warning, health or safety information, advertising or promotional information, political or governmental information or the like. Indeed, conventional links are ineffective in that the user can quickly effectively jump to another page or site before obtaining or viewing the information at the linked page, by merely activating a browser function, for example, to return them to the page originating the link, or to access a new site altogether. Thus, a need in the industry exists to allow a provider of information to direct the content accessed by an end user, even if for a short time, so that predetermined information can be presented to the user.

SUMMARY OF THE DISCLOSURE

Embodiments of the instant invention are directed to a method, apparatus and system for directing an on-line user to predetermined information. Preferred embodiments of the instant invention interface with the user's browser utilizing the link keys representing the functions of the browser, and any other keys used for these functions, to direct user "traffic" on a network by controlling or interacting with the browser functions.

In preferred embodiments, when a user accesses, or enters, a web site page, a traffic control program is executed for the page. Once the user accesses the web site, the traffic control program controls the transmission (downloading) of data to the user computer 12, which results in the web site being displayed through the browser at the user computer, and further creates a modified set of rules for at least one of the browser functions. These modified rules override or modify the browser default or normal software rules for such functions.

In preferred embodiments, an end user requests content from the provider computer. The provider computer 14 responds to the user's request for content by transmitting, that is, downloading content data for one or more HTML frames, corresponding to the user-requested content. In addition, further software, for example, browser script is also transmitted or downloaded, preferably with the content data. Upon receipt of the content software data and the additional software, the user computer generates a display corresponding to the content data associated with the HTML frame. In addition, the user computer generates a second frame defined by the additional software. The HTML frame is perceivable (for example, viewable) to the user as the content requested by the user. The second frame, however, is preferably a hidden frame, which is not visible to the user, but is nonetheless, maintained as a frame with the user's browser. The hidden frame is a peer frame with respect to the content (or viewable HTML) frame, in that the browser interacts, at least first, with the hidden frame during, for example, exit procedures (when the user attempts to exit the web site or page). In this regard, the software downloaded to the user computer for generating the hidden frame includes executable code and commands that are designed to interact with the user's browser software (for example, upon the user's attempt to exit the displayed web page).

In one preferred embodiment, to access further (or previously accessed) content and, thus, exit the content currently being displayed, the user may select one of the browser functions. In response to the executed browser function, the browser executes a closing routine to, in effect, close the presently displayed frame, to display a further frame. The closing routine involves a query to (or other suitable interaction with) the open frame set; that is, the browser queries (or otherwise interacts with) the software associated with the dominant frame (the hidden frame) and the content (or HTML) frame for any final instructions, as both of these frames are open in the browser at the time at which the user attempts to exit the content (or HTML) frame. As the hidden frame is the peer frame, the browser queries (or otherwise interacts with) the hidden frame first. Upon query (or other interaction) by the browser prior to closing the frames, the software associated with the hidden frame executes in conjunction with the browser's frame-closing routine and interacts with the browser software. It should be appreciated that the order in which the frames are addressed can be different in other embodiments.

The software associated with the hidden frame, in effect, modifies or controls one or more of the browser functions, such that the user computer accesses a predesignated site or page (and displays a predesignated frame) instead of accessing the site or page typically associated with the selected browser function.

The displayed destination is dependant upon the executed browser function. In preferred embodiments, the software (or browser script) associated with the hidden frame includes routines for controlling which further content, site or page (further HTML frames) that will be downloaded to the user computer, based on which browser function is selected by the user. Any suitable script language that is compatible with browser software, such as Java Script, may be employed for interaction with the browser to effect such control of content downloaded to the user.

An object of preferred embodiments is to direct the on-line user's attention to predetermined information so as to increase the possibility of the user's interest in such information.

A further object of preferred embodiments is to generate traffic for web sites and other Internet properties, and to provide advertising and purchasing opportunities to the user. An advantage to this object is that existing traffic on the web site can be leveraged such that traffic to one or more new destinations can be amplified.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of embodiments of the invention will be made with reference to the accompanying drawings, wherein like numerals designate corresponding parts in the figures.

FIG. 4 is a block diagram of various links and pages according to an embodiment of the instant invention.

DETAILED DESCRIPTION OF PREFERRED EMBODIMENTS

Preferred embodiments of the instant invention employ a network of computers and programs for controlling one or more of such computers for directing access to content by users on the network.

Hardware Environment

Figure 1:
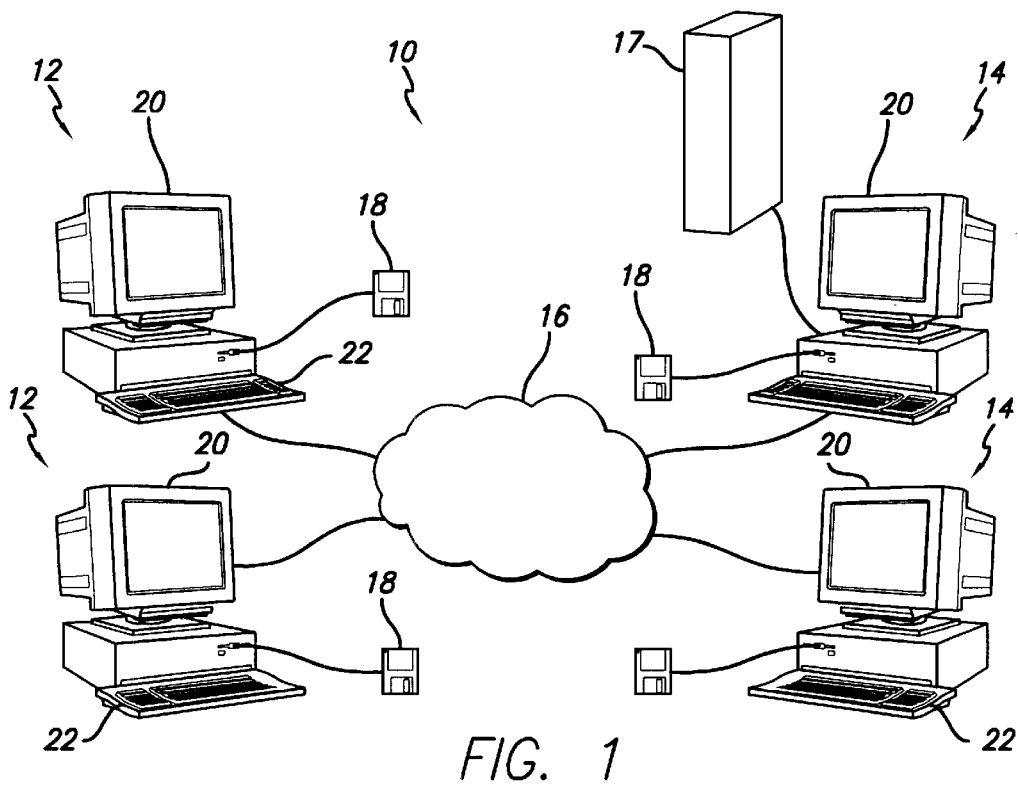
FIG. 1 is a network system environment in accordance with a preferred embodiment of the instant invention.

Preferred embodiments of the instant invention operate with a network comprising a plurality of networked computers, such as, for example, at least one user computer and at least one provider computer which are coupled together in a communications network, such as, for example, the Internet or WWW. FIG. 1 depicts a simplified representation of an example network system 10 that is operated in accordance with preferred embodiments of the invention.

The network system 10 includes at least one client or user computer 12 and at least one content provider or server computer 14 coupled for communication therebetween by the remainder of the network, generally represented at 16. In the illustrated embodiment, two client or user computers 12 and two content provider computers 14 are shown in the network system. It will be understood that further embodiments may employ any suitable number of user and provider computers. The network system 10 may comprise a closed or intranet configuration, an open or public-access network configuration or combinations of such configurations, as is well known in the art. For example, the user and provider computers 12 and 14 may be included in smaller, interconnected networks which compose the overall network system 10. In an Internet embodiment, the network system 10 comprises a combination of a large number of interconnected internets and intranets. For purposes of simplifying the present disclosure, the various hardware components (for example, host servers, routers, connectors) and software necessary for communication between computers on the network system are not described herein in detail. Such hardware and software are well within the scope of one of ordinary skill in the art and are at least partially dependent upon the type of network system employed and the desired application of use.

The user computer 12 may comprise any suitable network device capable of communicating with other network devices in the network system. In preferred embodiments, the user computer comprises a programmable processor capable of operating in accordance with programs stored on one or more computer readable media 18 (for example, but not limited to floppy disc, hard disc, computer network, random access memory (RAM), CD Rom, or the like), a display device 20 for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device 22 (for example, but not limited to, a keyboard, mouse, microphone, or the like). In one preferred embodiment, the user computer comprises a personal computer system having a CRT display, a keyboard and a mouse user-input device.

Figure 2:
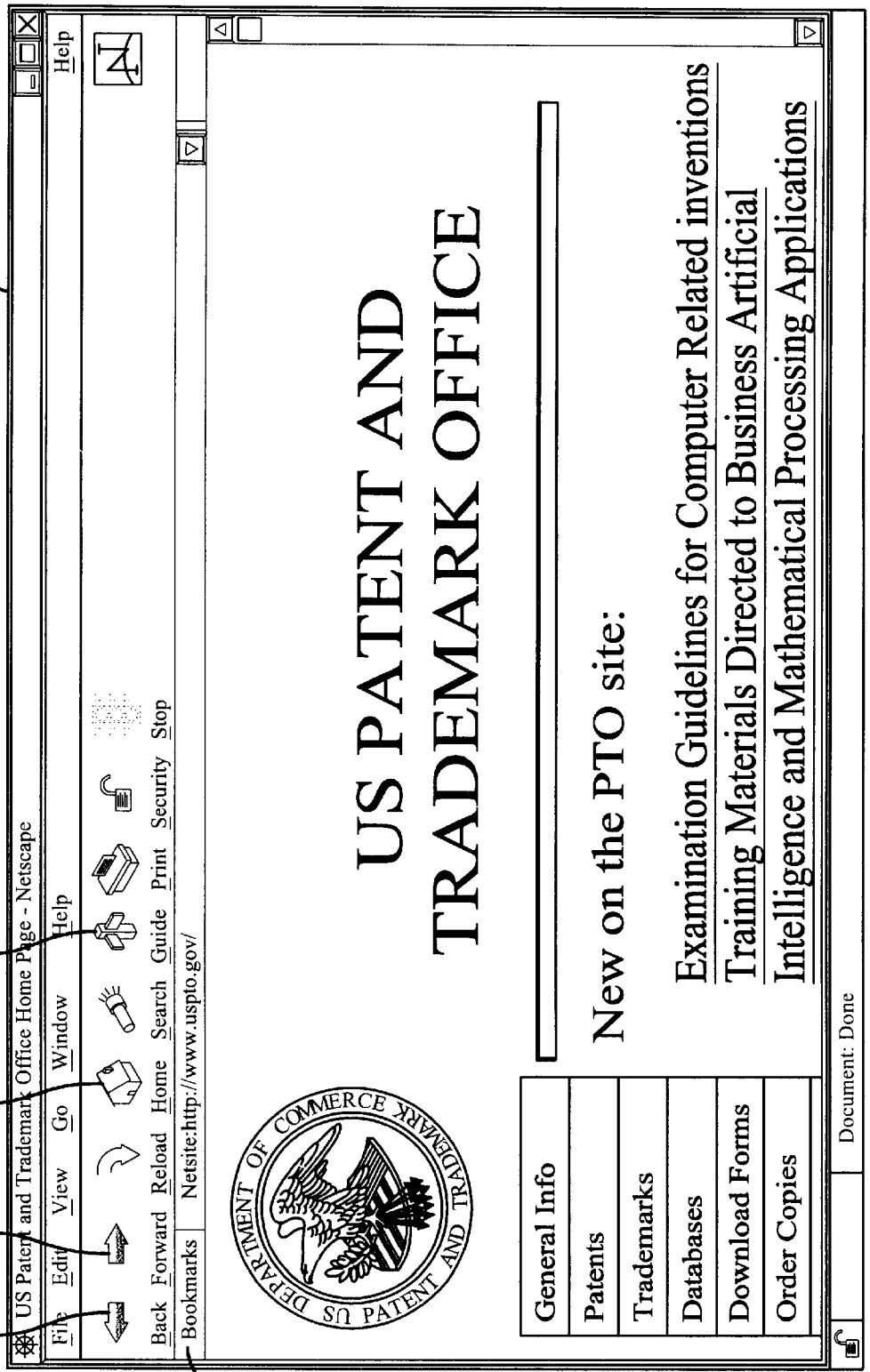
FIG. 2 is a display view of a sample browser page from the Internet, wherein the browser page includes function buttons.

The user computer 12 is controlled by suitable software, including network communication and browser software to allow a user to request, receive and display information (or content) from or through a content provider computer 14 on the network system 10. In preferred embodiments, the user computer 12 employs a program, such as a browser, for displaying content received from a provider computer 14. Typical browsers, for example, the Internet browser 22 shown in FIG. 2 include a variety of user operable functions that facilitate the user's control of their communication path through network, to control the user's access to content available on the network. Some of the typical user operated functions include, but are not limited to, Back 24, Forward 26, Home 28, an Address Location Slot 30, Bookmark 32 and Favorite Links 34 (not shown). These functions are depicted as link keys on the browser page as shown in FIG. 2.

The Back 24, Forward 26 and Home 28 functions allow a user to return to a previously viewed page (Back 24 and Forward 26) or a predesignated page (Home 28). The Back 24 function allows the user to return to the web site page initially viewed directly before the current page and the Forward 26 function allows the user to return to a page which was initially viewed after the current page. Thus, for example, if a user has already viewed pages 1, 2, 3, 4 and 5, respectively, and the user is currently reviewing page 4, the Back 24 function allows the user to return to page 3 and the Forward 26 function allows the user to return to page 5. The Home 28 function returns the user to the home or introductory page of the browser, such as that shown in FIG. 2. The Address Location Slot 30 allows the user to input an address of a specific web page and locate themself to that page. Both the Bookmark 32 and Favorite Links 34 functions allow the retrieval of a saved address of a web page.

The content provider computer 14 may comprise any suitable network device capable of providing content (data representing text, hypertext, photographs, graphics video and/or audio) for communication over the network. In preferred embodiments, the provider computer comprises a programmable processor capable of operating in accordance with programs stored on one or more computer readable media 24 (for example, but not limited to to, floppy disks, hard disks, random access memory RAM, CD-ROM), to provide content for communication to a user computer 12. The provider computer may comprise, for example, but not limited to, a personal computer, a mainframe computer, network computer, portable computer, personal data assistant (such as, a 3 Com Palm Pilot), or the like. The provider computer 14 may include one or more internal data storage devices (not shown) for storing content for communication to a user computer 12. Alternatively, or in addition, the provider computer 14 may be coupled to an external data storage device, computer or other means, generally represented at 26, from which the provider computer 14 may obtain content for communication to a user computer 12. In one embodiment, the external device 26 may comprise a further network device coupled in the network 16.

The content provider computer 14 is controlled by suitable software to provide the requested content to the requesting user computer 12, provided that various criteria are met. In addition, in accordance with preferred embodiments of the present invention, the provider computer 14 is also controlled by software to provide control instructions, routines or programs for communication to a user computer 12, for directing the user computer's access to further information (content) according to processes as discussed in more detail below.

In a preferred Internet environment, the content provider computer 14 is controlled by suitable software to respond to a valid request for content by providing (or downloading) data in the form of one or more HTML files to the user computer 12 from which the request was made. It will be understood by those skilled in the art that this process involves communications through suitable servers, routers and other components, as is dictated by the particular network environment.

The HTML file(s) correspond to one or more HTML frames which, in conjunction with the browser software at the user computer 12, is displayable on the display device at the user computer as text, hypertext, photographs, graphics, sound, or the like, in a form that is perceivable to the user. Upon receiving the HTML file(s) and displaying HTML frames, the user is said to have "entered" the web site or page corresponding to the HTML file. Thereafter, the user may desire to "exit" the web site or page, for example, by requesting and downloading (or entering) a further web site or page.

In typical Internet and other network transactions, the HTML frame data (or data in other suitable formats) downloaded from the provider computer 14 to the user computer 12 is accompanied by further software, such as browser script, for interacting with browser functions at the user computer. Software features commonly included with such browser script include features for interacting with the browser software during an exit procedure, that is, when the user is exiting a web site or page. As part of the exit procedure, the browser and the browser script software interact in a manner, as well known in the art, such that the browser script receives exiting instructions from the browser to close or dispose of additional computer resources that may have been accessed, such as, memory, graphic images or connections to data bases. As described in more detail below, preferred embodiments of the present invention involve the inclusion of software routines, for example as part of (but not limited to) browser script, for controlling the user computer's access to further data (for example, further HTML files) during an exit procedure. In example embodiments as described in further detail below, the user is, in effect, directed to one or more web sites or pages dictated by the browser script (or other suitable software), instead of, or in addition to, the site or page specifically selected by the user when exiting from the displayed site or page.

GENERAL DESCRIPTION OF PREFERRED EMBODIMENTS

Preferred embodiments of the instant invention utilize the link keys representing the above described functions of the browser, and any other keys used for these functions, for example, the close key or embedded hypertext, to direct user "traffic" on a network and, more preferably, on the Internet, by controlling or interacting with the browser functions. Traffic is generally understood as the volume of users accessing a given site over a given period of time. Thus, for example, with relation to a particular Internet site, traffic on the site is typically a reference to the movement of users to and from the site, that is, the number of users accessing and disconnecting from the particular site.

By directing traffic, preferred embodiments of the instant invention generate traffic for other web sites, web site collections, pages and other network (or, preferably, Internet) properties, such as, for example, www.apple.com, or www.webjump.com. The direction of the traffic allows existing traffic on network sites to be leveraged such that traffic to new destinations can be amplified. While embodiments of the invention may apply to various forms of communication networks, for purposes of simplifying the present disclosure, preferred embodiments are described herein, primarily with relation to the Internet. However, insofar as the claims are not limited by express language requiring the Internet environment, such claims are not intended to be limited to involve the Internet as the communication network.

In preferred embodiments, when a user accesses, or enters, a web site page, a traffic control program is executed for the page. Although a user does not physically move when entering or leaving a web site, it is generally understood that the accessing of a web site, or disconnection therefrom, is referenced as any term which connotes movement to and from a particular place, including, but not limited to, entering, traveling into, going to, leaving, exiting and visiting a web site. Once the user accesses the web site, the traffic control program controls the transmission (downloading) of data to the user computer 12, which results in the web site being displayed through the browser at the user computer, and further creates a modified set of rules for at least one of the browser functions. These modified rules modify or override the browser software rules for such functions.

Figure 3:
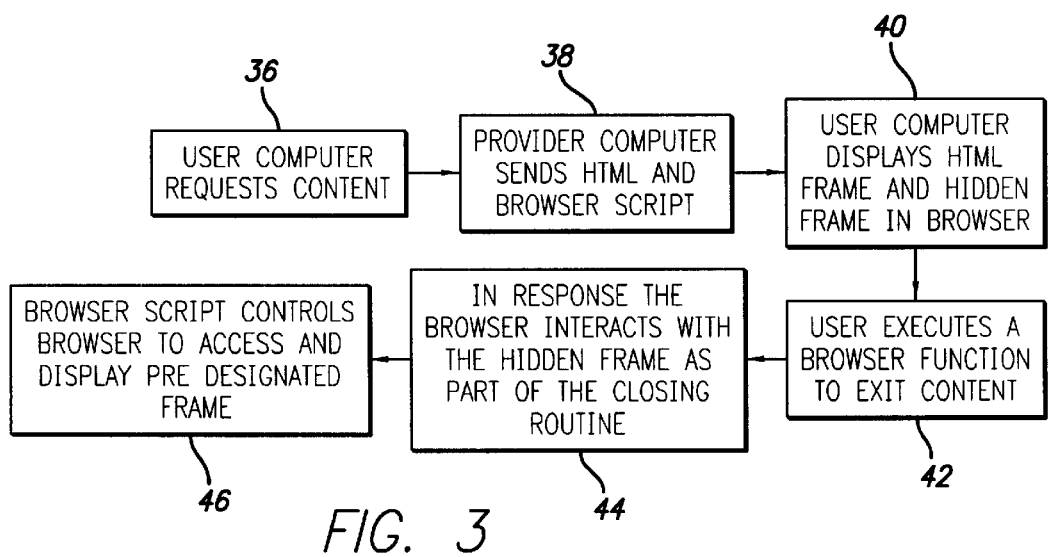
FIG. 3 is a block diagram of an interaction between the user computer and the provider computer according to an embodiment of the instant invention.

With reference to block diagram flow-chart of FIG. 3, in preferred embodiments, an end user requests content from the provider computer 14, as represented by block 36. In block 38, the provider computer 14 responds to the user's request for content by transmitting, that is, downloading, content data, for example, but not limited to, data for one or more HTML frames, corresponding to the user-requested content. In addition, further software, such as, browser script is also transmitted or downloaded, preferably with the content data. Technology and procedures for downloading of data (such as HTML frame data and further software, such as browser script) from one network site to another is well within the scope of those skilled in the art, and thus, is not discussed in further detail herein.

Upon receipt of the content software data (for example, HTML frame data) and the additional software (for example browser script), the user computer 12 generates a display corresponding to the content data (for example, by displaying visual images) associated with the HTML frame. In addition, the user computer 12 generates a second frame defined by the additional software. The display of these frames is represented by block 40 in FIG. 3. The content (or HTML) frame and the second frame define a frame set. As understood by one skilled in the art, the HTML frame is perceivable (for example, viewable) to the user as the content requested by the user. The second frame, however, is preferably a hidden frame, which is not visible to the user, but is nonetheless, maintained as a frame with the user's browser. The hidden frame is a dominant frame with respect to the content (or viewable HTML) frame, in that the browser interacts, at least first, with the hidden frame during, for example, exit procedures (when the user attempts to exit the web site or page). In this regard, the software downloaded to the user computer for generating the hidden frame includes executable code and commands that are designed to interact with the user's browser software (for example, upon the user's attempt to exit the displayed web page).

In one preferred embodiment, to access further (or previously accessed) content and, thus, exit the content currently being displayed, the user may select one of the browser functions (discussed below), as represented by block 42 in FIG. 3. Thus, for instance, a user may select a Back function of the browser. In response to the executed browser function, for example, a Back function, the browser executes a closing routine to, in effect, close the presently displayed frame, to display a further frame. The closing routine involves a query to (or other suitable interaction with) the open frame set; that is, the browser queries (or otherwise interacts with) the software associated with the dominant frame (the hidden frame) and the content (or HTML) frame for any final instructions, as both of these frames are open in the browser at the time at which the user attempts to exit the content (or HTML) frame. As the hidden frame is the dominant frame, the browser queries (or otherwise interacts with) the hidden frame first. Upon query (or other interaction) by the browser prior to closing the frames, the software associated with the hidden frame executes in conjunction with the browser's frame-closing routine and interacts with the browser software, as represented by block 44 in FIG. 3.

The software associated with the hidden frame, in effect, modifies or controls one or more of the browser functions, for example, the Back function (discussed below), such that the user computer accesses a predesignated site or page (and displays a predesignated frame) instead of accessing the site or page typically associated with the selected browser function.

The displayed destination is dependant upon the executed browser function. In preferred embodiments, the software (or browser script) associated with the hidden frame includes routines for controlling which further content, site or page (further HTML frames) that will be downloaded to the user computer, based on which browser function is selected by the user. Any suitable script language that is compatible with browser software, including, but not limited to, Java Script, JScript and Visual Basic Script, may be employed for interaction with the browser to effect such control of content downloaded to the user.

Thus, for instance, the software (or browser script) may include routines for directing the user's computer to access (enter) a first predefined content, such as a first web site or page, in response to the user's selection of a first browser function. In further preferred embodiments, the software (or browser script) may include routines for directing the user's computer to access (enter) a second predefined content (site or page), in response to the user's selection of a second browser function, where the second content is different than the first content and the second browser function is different than the first browser function. Likewise, third and further content (sites or pages) may be accessed (entered) in response to the user's selection of third or further browser functions. Thus, for example, if the Back function is selected by the user, the software may direct the display of destination A; if the Forward function is selected the software may direct the display of destination B; and if the Exit function is selected the browser may be directed to display destination C. Any combination or choices of destinations can be made.

With reference to FIG. 4, in preferred embodiments, a user connects to a initial page or start page 48. The start page 48 is an introductory page which can include, but is not limited to, descriptive information regarding the web site, sales or promotional information, links for accessing related information and graphics. The start page 48 further includes at least one traffic controlled link 50 and at least one non-traffic controlled link 52.

In preferred embodiments, the traffic controlled link 50 is a hyperlink written, for example, in HTML language, that connects the user to another page of information, wherein the page that the user is connected to is predetermined by the provider computer 16. The traffic controlled link 50 is coupled to one of the browser's functions that are operable pursuant to the modified set of rules created by the traffic control program. The hyperlink destination may be a part of the web site that the user is currently visiting, an entirely new site, or a prior destination that the user has previously visited. Traffic controlled links 52 can be associated with any function of the browser desired to be controlled, including, but not limited to, Back 24, Forward 26, Home 28, Address Location Slot 30, Bookmark 32, Favorite Links 34, Exit 42 and the operation of opening a new browser window.

The non-traffic controlled link 52 is any of the browser functions that are not operable by the modified set of rules created by the traffic control program. The non-traffic controlled links 52 allow the user to exit the web site pursuant to the rules generally operating for these functions without being directed to the provider s predetermined information.

With reference to FIG. 4, a user enters the start page 48 of the web site according to conventional network access procedures, wherein the start page 48 includes traffic controlled links 50 and non-traffic controlled links 52. In preferred embodiments, the user cannot distinguish a traffic controlled link 50 from a non-traffic controlled link 52. If a user decides to exit the web site, the user may do so by any hyperlink button associated with the web site, or may do so by any one of the browser functions that are non-traffic controlled links 52.

For instance, and as illustrated in FIG. 4, the Back 24 function and the Exit 42 function of the browser are traffic controlled links 50, and thus, subject to modified rules of operation. In this embodiment, if the user activates the Back 24 function, the user does not connect to the previously viewed page; rather, the user connects to site A. Similarly, if the user attempts to exit the web site currently being viewed via the Exit 54 function, the user will be directed to site B. Sites A and B can be any location predetermined by the provider, including, but not limited to, a part of the current site, for example, a different page; a different site; or a previously viewed site. In some embodiments, one or both of sites A and B contain traffic controlled links 50 such that the communication link of the user can be further directed. In other preferred embodiments, neither site contains traffic controlled links 50 such that the user's communication link is no longer directed.

In this embodiment, site A includes a traffic controlled link 50, that is, the Back 24 function. If the user attempts to exit site A via the Back 24 function, the user will be directed to site E. Site E contains no traffic controlled links 50, and thus, the user is able to exit site E in a manner consistent with the function engaged by the user. If instead of activating the Back 24 function from site A, the user activates any other browser function, the user will exit site A in a manner consistent with the function engaged by the user.

Again referring to the user exiting the web site from the start page 48, if the user activates the Home 28 or Bookmark 32 functions, the user is directed to sites C and D respectively. Sites C and D are destinations from non-traffic controlled links 52, and thus, the user is directed to the home page of the browser (site C) or the page representative of the chosen bookmark site (site D). By activating one of the non-traffic controlled links 52, that is, a non-traffic controlled browser function, the user exits the web site in the manner consistent with the mode of operation typically associated with these functions.

Figure 5:
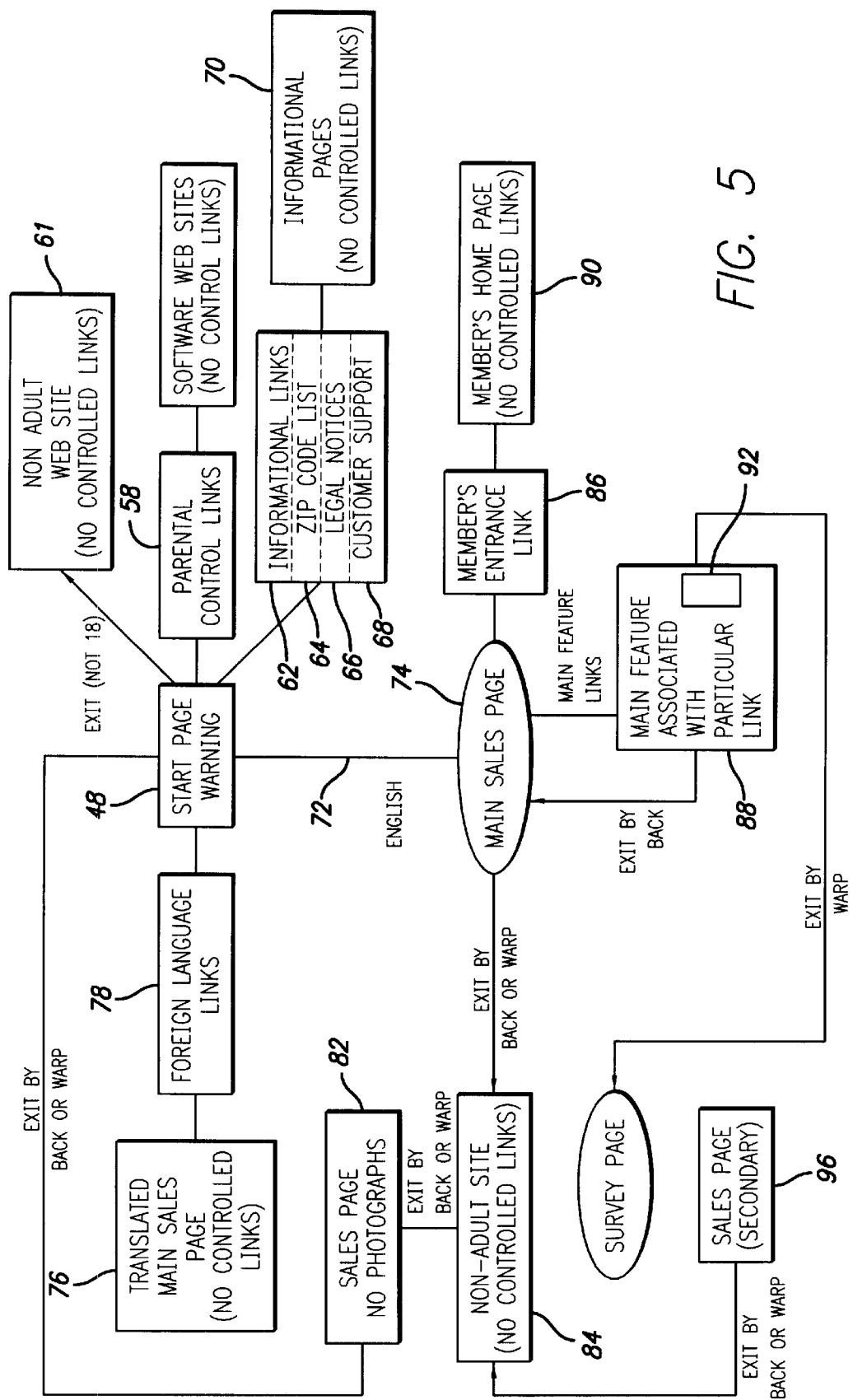
FIG. 5 is a block diagram various links and pages according to another embodiment of the invention.

FIG. 5 is a block diagram of another preferred embodiment of the instant invention. In this embodiment, the web site is a sales presentation, wherein the user is solicited to register as a member of the site which allows the user access to the content of the web site. In one preferred embodiment, the web site provides adult content, although the web site can contain any type of information that the provider is desirous of presenting to the user.

Similar to other preferred embodiments, the adult content web site includes a start page 48. Due to the specific content of the adult site, the start page 48 is a warning page, wherein the user is required to affirm their legal age and/or provide other information which is designed to prevent unauthorized viewing by targeted audiences; namely, persons under a legally defined age, which is currently set at 18 years of age.

The user enters the start page 48 via a search engine 56, such as, for example, Yahoo, or through a provider banner 56, such as, an advertising link specific to the provider. The start or warning page 48 presents information for the user prior to accessing the site, such as, warning information regarding the data content of the site. The start page 48 further includes traffic controlled links 50 and non-traffic controlled links 52.

Various non-traffic controlled links 52 are included on the web site, in part, to prevent unauthorized viewing of the content. In preferred embodiments, the non-traffic control links 52 include the Exit 54 function, a plurality of parental control links 58 and a plurality of legal/information control links 60.

A viewer who indicates that they are not 18 years of age, or who activates the Exit 54 function hyperlinks to a first non-adult new web site 61. The first non-adult web site does not contain adult content and is not traffic controlled or destination controlled. In preferred embodiments, the first non-adult web site is any non-adult, non-traffic controlled site, such as, for example, another provider, or non-provider, site having, for example, sports or music content. Once the user exits the web site via the Exit 54 function, the user's communication link is not controlled and the user is free to connect with any location chosen by the user.

In addition to the Exit 54 function, the web site includes a plurality of parental control links 58. The user accesses the parental control links 58 by a browser link. The parental control links 58 send a user to the home site of the manufacturers of a filtering software. The filtering software is designed to prohibit users from accessing the content on the adult web site. The parental control links 58 are non-traffic control links 52. As such, once the user exits the adult web site via the parental control links 58, the user can freely choose his next destination.

The legal/information control links 60 are accessed by a browser link. The legal/information control links 60 further include informational link 62, territorial link 64, legal notice link 66 and customer support link 68. Each legal/information control link 60 connects the user to an information page 70 that is associated with the particular link.

For instance, the informational links 62 connect the user to an information page(s) 70 which provide information related to the web, such as, for example, terms and conditions for membership. The territorial link 64 connects the user to an information page 70 that includes information regarding the locations where the adult content can legally be downloaded, such as, for example, a zip code list. The legal notice link 66 connects the user to various legal notices regarding the state of the law on pertinent issues, such as, for example, copyright and trademark laws. The customer support link 68 connects the user to information regarding obtaining or connecting to customer support. None of the legal/information control links 60 are traffic controlled destinations such that the user is free to exit the destination to a user desired location or reenter the adult web site start page 48.

The traffic control links 50 contained on the warning page 48 comprises a sales link 72 that directs the user to the main sales page 74 for the site. Information contained on the warning page 48 also allows the user to access a translated main sales page 76 via a foreign sales link 78. The main sales page 74 has been translated into various languages, including, but not limited to, German, French, Spanish and Italian. It is to be appreciated that the main sales page 74 can be translated into as many languages as desired.

If the user activates the foreign sales link 78, the user will be connected to the associated translated foreign sales page 76. The foreign sales pages 76 do not contain traffic control links 50. Thus, a curious user or one who has accidently activated the link 78 can easily return to the starting page 48.

To access an English version of the main sales page 74, the user selects a main Entry link 72. The main sales page 74 comprises adult content, such as, photographic content, and a second warning regarding the nature of the content on the web site. The main sales page 74 provides the user with promotional and sales information which attempts to get the user to purchase a membership in the web site. As previously stated, the membership allows the user to access the data content of the web site.

If the user attempts to exit the main sales 74, or foreign sales page 76, by activating the Back 24 function, or by any means of exiting the site that is not the Back 24 function, known as Warp 80, the user is directed to a modified sales page 82. The modified sales page 82 is a substantial duplicate of the main sales page 74 without the photographic material. The modified sales page 82 provides the user another opportunity to purchase a membership in the web site. If the user again decides not to purchase the membership and exits the site via the Back 24 function or the Warp 80 function, the user is directed to a non-traffic controlled destination 84. The non-traffic controlled destination is any provider or non-provider site which comprises any type of non-adult content data, such as, for example, music, sports or news.

The main Entry link 72 directs the user to the English page version of the main sales page 74. This main sales page 74 further comprises an Entrance link 86 and a plurality of main feature links 88. The Entrance link 86 connects users, who are current members of the web site, to a member's home page 90.

If the user attempts to exit the main sales page 74 via the Back 24 function or the Warp 80 function, the user is directed to a Survey page 94. The survey page 94 is a page that is designed to obtain information from the user. The questions included on the survey page 94 can include any type of information that the provided desires for any given purpose. Further, in some preferred embodiments, the survey page 94 comprises other information, such as, for example, incentives or offers. For instance, in one preferred embodiment, the survey page 94 requests information that is directed to obtain information as to why the user declined the purchase of a membership. Additionally, the survey page 94 offers the user an upgraded membership, at a discount, for answering the listed questions.

If the user completes the survey page 94, that is, answers the questions, the user is directed to the members' home page 90. If the user fails to complete the survey page 94 and attempts to exit the survey page 94 by any means other than completing the survey, for example, by Exit 54 or Warp 80, the user is directed to a secondary sales page 96. If the user again declines the purchase a membership, the user is directed to the non-traffic controlled destination 84. As with all non-traffic controlled destinations, the browser functions operate in a manner consistent with their expected uses and the user is free to move to a chosen destination.

The main feature links 88 on the main sales page 74 are links that are associated with specific features contained on the web site. If the user activates one of the plurality of main feature links 88, the user is directed to a sign-up page 92 for the feature associated with the specific main feature link 88 activated. The sign-up page 92 allows the user to purchase a membership in the web site. If the user decides not to purchase a membership, the user will exit the sign-up page 92. If the user exits the sign-up page 92 via the Back 24 function, the user is directed back to the main sales page 74 on the premise that the user is desirous of more information prior to purchasing a membership. Once at the main sales page 74, the user is subjected to the traffic control links 50 as previously described.

If the user exits the sign-up page 92 via the Warp 80 function, the user is directed to the survey page 94. The user is then subject to the traffic control functions associated with the survey page 94. The user's communication link is then controlled in the manner described above with respect to the survey page.

Although the preferred embodiments have been described with a particular number of traffic control links and non-traffic control links, it is to be understood that embodiments of the instant invention can be configured to include any number of traffic control links and non-control links. Further, embodiments of the instant invention are not limited in the number of destinations to which the user is sent. Indeed, the provider can configure a simplistic controlled pathway for the user, or a complicated pathway. The configuration of the user's communication pathway is dependent upon the needs of the provider. Further, the information the user is directed to can include any type of information desired by the provider, and thus, is not limited to the examples described herein. An example of suitable procedures and instruction for an HTML programmer to implement an Internet-based system according to one preferred embodiment of the invention is described in the attached appendix, which is incorporated herein by reference.

Further, although foregoing examples have been made with reference to adult content based web sites, it is not intended to limit the invention. Rather, the disclosure it is intended to include other preferred embodiments encompassing other types of content to which a user can be sent.

Further, it is to be understood that the links described in the above embodiments are not intended to limit the invention. Indeed, embodiments of the invention can exclude any of the above described links or include any other type of link. As such, the foregoing is intended to cover all modifications and alternative constructions falling within the spirit and scope of the invention.

What is claimed is:

1. In a computer network comprising a plurality of recipient computers having browsers capable of displaying content pages within a frameset, wherein individual ones of the browsers have at least one frame-unloading function operable without activation of a link in a displayed content page to unload a frameset associated with the displayed content page, a method for apparently modifying operation of the at least one frameset-unloading function of a browser, thereby displaying a predetermined second content page upon activation of the at least one frameset-unloading function, comprising the steps of:

receiving a request for a first content page from a recipient computer over the network;

transferring the first content page of the recipient computer after said receiving step;

transferring a frameset page with the first content page to the recipient computer, the frameset page specifying a frameset comprising at least one frame for displaying the first content page, wherein the frameset page includes an unload function configured to execute upon activation of the at least one frameset-unloading function of the browser without the selection of any link on the first content page, whereby the unload function causes the recipient computer to request a second content page;

receiving a request for the second content page from a recipient computer after the second transferring step; and transferring the second content page to the recipient computer after the second receiving step.

2. The method of claim 1, wherein the at least one frame-unloading function of the browser is activated by requesting a third content page not using a link displayed on the first content page, and the method further comprises preventing display of the third content page on the receipt computer.

3. The method of claim 1, wherein the first transferring step further comprises transferring the first content page as an HTML page.

4. The method of claim 1, wherein the second transferring step further comprises transferring the frameset page with the unload function written in a browser script.

5. The method of claim 1, wherein the second transferring step further comprises transferring the frameset page including at least one hidden frame.

6. The method of claim 1, wherein the first transferring step further comprises transferring the first content page comprising a page with at least one link to a traffic-controlled page.

7. The method of claim 1, wherein the first transferring step further comprises transferring the first content page comprising a page with at least one link to a non-traffic-controlled page.

8. In a computer network system comprising a plurality of recipient computers having browsers capable of displaying content pages within a frameset, wherein individual ones of the browsers have at least one page-unloading function operable without activation of a link in a displayed content page to unload a displayed content page of a frameset, a method for apparently modifying operation of the at least one page-unloading function of a browser displaying a first content page, thereby displaying a predetermined second content page upon activation of the at least one page-unloading function, comprising the steps of:

receiving a request for a first content page from a recipient computer over the network;

transferring the first content page to the recipient computer after said receiving step;

transferring a first control page and a second control page to the recipient computer with the first content page;

transferring a frameset to the recipient computer with the first content page, the frameset page specifying a frameset comprising at least two frames, a display frame for displaying the first content page, and a control frame for loading the first control page and the second control page in sequence, whereby activation of the at least one page-unloading function of the browser unloads the second control page and loads the first control page, activating a page-loading function on the first control page to cause the recipient computer to request a second content page for the display frame;

receiving a request for the second content page from a recipient computer after the third transferring step; and transferring the second content page to the recipient computer after the second receiving step.

9. The method of claim 8, wherein the at least one page-unloading function of the browser is activated by requesting a third content page not using a link displayed on the first content page, and the method further comprises preventing display of the third content page on the recipient computer.

10. The method of claim 8, wherein the first transferring step further comprises transferring the first content page as an HTML page.

11. The method of claim 8, wherein the second transferring step further comprises transferring the first control page with the page-loading function written in a browser script.

12. The method of claim 8, wherein the third transferring step further comprises transferring the frameset page with the control frame formatted as a hidden frame.

13. The method of claim 8, wherein the first transferring step further comprises transferring the first content page comprising a page with at least one link to a traffic-controlled page.

14. The method of claim 8, wherein the first transferring step further comprises transferring the first content page comprising a page with at least one link to a non-traffic-controlled page.

15. In a computer network comprising a plurality of recipient computers having browsers capable of displaying content pages, wherein individual ones of the browsers have at least one page-unloading function operable without activation of a link in a displayed content page to unload a displayed content page, a method for apparently modifying operation of the at least one page-unloading function of a browser displaying a first content page, thereby displaying a predetermined second content page upon activation of the at least one page-unloading function, comprising the steps of:

receiving a request for a first content page from a recipient computer over the network;

transferring the first content page to the recipient computer after said receiving step, wherein the first content page is formatted for display on the recipient computer and wherein the first content page includes an unloaded function configured to execute upon activation of the at least one page-unloaded function of the browser without the selection of any link displayed on the first content page, whereby the unload function causes the recipient computer to request a second content page;

receiving a request for the second content page from a recipient computer after the second transferring step; and transferring the second content page to the recipient computer after the second receiving step.

16. The method of claim 15, wherein the at least one page-unloading function of the browser is activated by requesting a third content page not using a link displayed on the first content page, and the method further comprises preventing display of the third page on the recipient computer.

17. The method of claim 15, wherein the first transferring step further comprises transferring the first content page as an HTML page.

18. The method of claim 15, wherein the first transferring step further comprises transferring the first content page with the page-loading function written in a browser script.

19. The method of claim 15, wherein the first transferring step further comprises transferring the first content page with a frameset page.

20. The method of claim 15, wherein the first transferring step further comprises transferring the first content page comprising a page with at least one link to a traffic-controlled page.

21. The method of claim 15, wherein the first transferring step further comprises transferring the first content page comprising a page with at least one link to a non-traffic-controlled page.

22. For a computer network comprising a plurality of recipient computers having browsers capable of displaying content pages within a frameset, wherein individual ones of the browsers have at least one frame-unloading function operable without activation of a link in a displayed content page to unload a frameset associated with the displayed content page, a system for apparently modifying operation of the at least one frameset-unloading function of a browser, thereby displaying a predetermined second content page upon activation of the at lest one frameset-unloading function, comprising:

a provider computer adapted to connect to a computer network, said provider computer operable to serve information to a recipient computer upon request therefrom;

a memory connected to said provider computer;

a first content page stored in the memory, the first content page formatted for display in at least one frame of a display on a recipient computer; and a frameset page for the first content page stored in the memory, the frameset page specifying a frameset comprising at least one frame for displaying the first content page, wherein the frame set page includes program instructions for an unload function configured to execute upon activation of the at least one frameset-unloading function of the browser without the selection of any link on the first content page, whereby the unload function is configured to cause the recipient computer to request a second content page.

23. The system of claim 22, wherein the at least one frame-unloading function of the browser is activated by requesting a third content page not using a link displayed on the first content page, and the program instructions in the frameset page include instructions for preventing display of the third content page on the recipient computer.

24. The system of claim 22, wherein the first content page is an HTML page.

25. The system of claim 22, wherein the program instructions of the frameset page are written in a browser script.

26. The system of claim 22, wherein the frameset page includes instructions for creating at least one hidden frame.

27. The system of claim 22, wherein the first content page comprises at least one link to a traffic-controlled page.

28. The system of claim 22, wherein the first content page comprises at least one link to a non-traffic-controlled page.

29. For a computer network comprising a plurality of recipient computers having browsers capable of displaying content pages within a frameset, wherein individual ones of the browsers have at least one page-unloading function operable without activation of a link in a displayed content page to unload a displayed content page, a system for apparently modifying operation of the at least one page-loading function of a browser, thereby displaying a predetermined second content page upon activation of the at least one page-loading function, comprising:

a provider computer adapted to connect to a computer network, said provider computer operable to serve information to a recipient computer upon request therefrom;

a memory connected to said provider computer;

a first content page stored in the memory, the first content page formatted for display in at least one frame of a display on a recipient computer;

a first control page and a second control page stored in the memory; and a frameset page stored in the memory for the first content page, the first control page, and the second control page, the frameset page specifying a frameset comprising at least two frames, a display frame for displaying the first content page, and a control frame for loading the first control page and the second control page in sequence, whereby activation of the at least one page-unloading function of the browser unloads the second control page and loads the first control page, activating a page-loading function of program instructions on the first control page to cause the recipient computer to request a second content page for the display frame.

30. The system of claim 29, wherein the at least one page-unloading function of the browser is activated by requesting a third content page not using a link displayed on the first content page, and the program instructions of the first control page include instructions for preventing display of the third content page on the recipient computer.

31. The system of claim 29, wherein the first content page is an HTML page.

32. The system of claim 29, wherein the program instructions of the first control page are written in a browser script.

33. The system of claim 29, wherein the frameset page includes instructions for formatting the control frame as a hidden frame.

34. The system of claim 29, wherein the first content page comprises at least one link to a traffic-controlled page.

35. The system of claim 29, wherein the first content page comprises at least one link to a non-traffic-controlled page.

36. For a computer network comprising a plurality of recipient computers having browsers capable of displaying content pages, wherein individual ones of the browsers have at least one page-unloading function operable without activation of a link in a displayed content page to unload a displayed content page, a system for apparently modifying operation of the at least one page-unloading function of a browser displaying a first content page, thereby displaying a predetermined second content page upon activation of the at least one page-unloading function, comprising:

- a provider computer adapted to connect to a computer network, said provider computer operable to serve information to a recipient computer upon request therefrom;
- a memory connected to said provider computer;
- a first content page stored in the memory, the first content page formatted for display in at least one frame of a display on a recipient computer and the first content page including program instructions for an unload function configured to execute upon activation of the at least one page-unloading function of the browser without the selection of any link displayed on the first content page, whereby the unload function causes the recipient computer to request a predetermined second content page.

37. The system of claim 36, wherein the at least one page-unloading function of the browser is activated by requesting a third content page not using a link displayed on the first content page, and the program instructions of the first content page include instructions for preventing display of the third content page on the recipient computer.

38. The system of claim 36, wherein the first content page is an HTML page.

39. The system of claim 36, wherein the program instructions of the first content page are written in a browser script.

40. The system of claim 36, further comprising a frameset page stored in the memory for transfer to the recipient computer with the first content page.

41. The system of claim 36, wherein the first content page comprises at least one link to a traffic-controlled page.

42. The system of claim 36, wherein the first content page comprises at least one link to a non-traffic-controlled page.

* * * * *

(12) EX PARTE REEXAMINATION CERTIFICATE (5253rd)
United States Patent
Shuster

(10) Number: US 6,389,458 C1
(45) Certificate Issued: Jan. 10, 2006

(54) METHOD, APPARATUS AND SYSTEM FOR DIRECTING ACCESS TO CONTENT ON A COMPUTER NETWORK

(75) Inventor: Brian Shuster, Stateline, NV (US)

(73) Assignee: Ideaflood, Inc., Zephyr Cove, NV (US)

Reexamination Request:
No. 90/006,736, Aug. 8, 2003

Reexamination Certificate for:
Patent No.: 6,389,458
Issued: May 14, 2002
Appl. No.: 09/183,605
Filed: Oct. 30, 1998

(51) Int. Cl.
*G06F 15/167* (2006.01)

(52) U.S. Cl. .................. 709/213; 709/219; 345/1.1; 715/760

(58) Field of Classification Search ................ 709/213, 709/219, 245; 715/760; 345/1.1
See application file for complete search history.

(56) References Cited

PUBLICATIONS

Van Doorn, "How to Interceipt The Button Click on The Back And Forward Arrows," Feb. 22, 1997 (Print–out from Newsgroup comp.lang. Javascript).
Foster, "Pop Up Window Left On Screen," Apr. 7, 1997 (Print–out from Newsgroup comp. Infosystems.www.authoring.html).
Anthony Q. Bachler, "NN3.01 Crashes With OnUnload," Feb. 14, 1997 (Print–out from Newsgroup comp.lang. Javascript).
Biff Steel, "Trapping 'Back' Browser Button," Apr. 17, 1997 (Print–out from Newsgroup comp.lang. Javascript).
Barbie, "My Legs Are Spread Open," Oct. 22, 1997 (Print–out of Javascript from Newsgroup alt.binaries.erotica).
Anonymous, "Nu," Oct. 24, 1997 (Print–out of Javascript from Newsgroup alt.sex.teddy–ruxpin).

*Primary Examiner*—Frantz B. Jean

(57) ABSTRACT

Embodiments of the instant invention are directed to a method, apparatus and system for directing an on-line user to predetermined information. Preferred embodiments of the instant invention interface with the user's browser to utilize the functions of the browser for directing user "traffic" on a network. In preferred embodiments, when a user accesses a web site page, a traffic control program is executed for the page, wherein the traffic control program controls the transmission (downloading) of data to the user computer and further creates a modified set of rules for at least one of the browser functions. Upon query (or other interaction) by the browser prior to closing page, the traffic control program interacts with the browser software to modify or control one or more of the browser functions, such that the user computer is further directed to a predesignated site of page (and displays a predesignated frame) upon execution of a browser function, instead of accessing the site or page typically associated with the selected browser function.

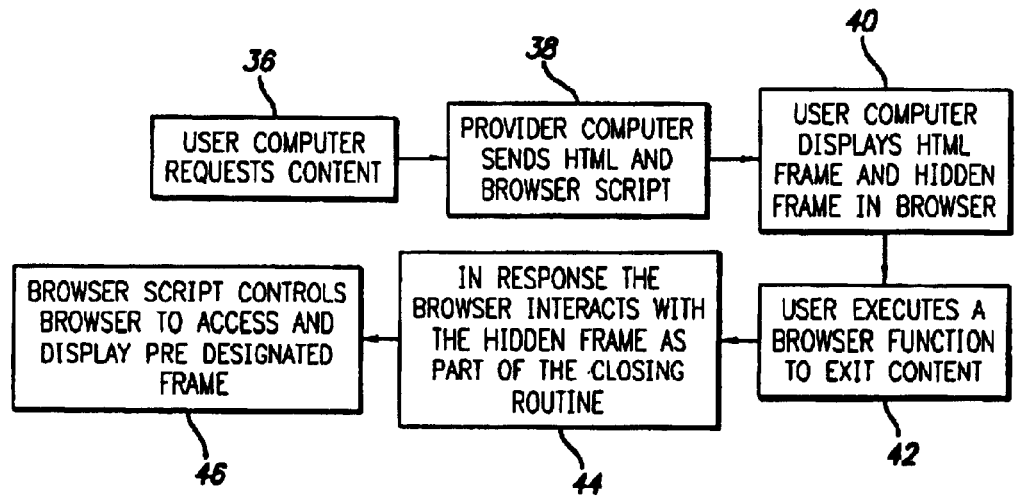

US 6,389,458 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8–14 and 29–35 is confirmed.

Claims 1, 15, 22 and 36 are determined to be patentable as amended.

Claims 2–7, 16–21, 23–28 and 37–42, dependent on an amended claim, are determined to be patentable.

1. In a computer network comprising a plurality of recipient computers having browsers capable of displaying content pages within a frameset, wherein individual ones of the browsers have at least one frame*set*-unloading function operable without activation of a link in a displayed content page to unload a frameset associated with the displayed content page, a method for apparently modifying operation of the at least one frameset-unloading function of a browser, thereby displaying a predetermined second content page upon activation of the at least one frameset-unloading function, comprising the steps of:

receiving a request for a first content page from a recipient computer over the network;

transferring the first content page of the recipient computer after said receiving step;

transferring a frameset page with the first content page to the recipient computer, the frameset page specifying a frameset comprising at least one frame for displaying the first content page, wherein the frameset page includes an unload function configured to execute upon activation of the at least one frameset-unloading function of the browser without the selection of any link on the first content page, whereby the unload function causes the recipient computer to request a second content page *having further instructions for modifying operation of the at least one frameset-unloading function*;

receiving a request for the second content page from a recipient computer after the second transferring step; and transferring the second content page *and the further instructions* to the recipient computer after the second receiving step.

15. In a computer network comprising a plurality of recipient computers having browsers capable of displaying content pages, wherein individual ones of the browsers have at least one page-unloading function operable without activation of a link in a displayed content page to unload a displayed content page, a method for apparently modifying operation of the at least one page-unloading function of a browser displaying a first content page, thereby displaying a predetermined second content page upon activation of the at least one page-unloading function, comprising the steps of:

receiving a request for a first content page from a recipient computer over the network;

transferring the first content page to the recipient computer after said receiving step, wherein the first content page is formatted for display on the recipient computer and wherein the first content page includes an [unloaded] *unload* function configured to execute upon activation of the at least one page-[unloaded]*unloading* function of the browser without the selection of any link displayed on the first content page, whereby the unload function causes the recipient computer to request a second content page *having further instructions for modifying operation of the at least one page-unloading function*;

receiving a request for the second content page from a recipient computer after the second transferring step; and transferring the second content page *and the further instructions* to the recipient computer after the second receiving step.

22. For a computer network comprising a plurality of recipient computers having browsers capable of displaying content pages within a frameset, wherein individual ones of the browsers have at least one frame-unloading function operable without activation of a link in a displayed content page to unload a frameset associated with the displayed content page, a system for apparently modifying operation of the at least one frameset-unloading function of a browser, thereby displaying a predetermined second content page upon activation of the at lest one frameset-unloading function, comprising:

a provider computer adapted to connect to a computer network, said provider computer operable to serve information to a recipient computer upon request therefrom;

a memory connected to said provider computer;

a first content page stored in the memory, the first content page formatted for display in at least one frame of a display on a recipient computer; and a frameset page for the first content page stored in the memory, the frameset page specifying a frameset comprising at least one frame for displaying the first content page, wherein the [frame set] *frameset* page includes program instructions for an unload function configured to execute upon activation of the at least one frameset-unloading function of the browser without the selection of any link on the first content page, whereby the unload function is configured to cause the recipient computer to request a second content page *having further instructions for modifying operation of the at least one page-unloading function.*

36. For a computer network comprising a plurality of recipient computers having browsers capable of displaying content pages, wherein individual ones of the browsers have at least one page-unloading function operable without activation of a link in a displayed content page to unload a displayed content page, a system for apparently modifying operation of the at least one page-unloading function of a browser displaying a first content page, thereby displaying a predetermined second content page upon activation of the at least one page-unloading function, comprising:

a provider computer adapted to connect to a computer network, said provider computer operable to serve information to a recipient computer upon request therefrom;

a memory connected to said provider computer;

a first content page stored in the memory, the first content page formatted for display in at least one frame of a [display] *frameset* on a recipient computer and [the first content page including program instructions for] an unload function *associated with the first content page, the unload function* configured to execute upon activation of the at least one page-unloading function of the browser without the selection of any link displayed on the first content page, [whereby the unload function causes] *causing* the recipient computer to request a predetermined second content page, *and to display the second content page in the frame.*

* * * * *